(12) United States Patent
Maes

(10) Patent No.: US 8,542,671 B2
(45) Date of Patent: Sep. 24, 2013

(54) SERVICE PROVIDER FUNCTIONALITY WITH POLICY ENFORCEMENT FUNCTIONAL LAYER BOUND TO SIP

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1351 days.

(21) Appl. No.: 11/536,731

(22) Filed: Sep. 29, 2006

(65) Prior Publication Data

US 2008/0080479 A1    Apr. 3, 2008

(51) Int. Cl.
*H04L 12/66* (2006.01)
*H04M 7/00* (2006.01)

(52) U.S. Cl.
USPC .......................................... 370/352; 379/230

(58) Field of Classification Search
USPC ................. 709/206, 226, 225; 455/410, 411; 713/151; 370/352, 353, 354, 355, 356, 357, 370/358
See application file for complete search history.

(56) References Cited

U.S. PATENT DOCUMENTS

| | | | |
|---|---|---|---|
| 6,516,416 B2 | 2/2003 | Gregg et al. | |
| 7,290,288 B2 | 10/2007 | Gregg et al. | |
| 2002/0044567 A1* | 4/2002 | Voit et al. | 370/467 |
| 2002/0129236 A1* | 9/2002 | Nuutinen | 713/151 |
| 2003/0031165 A1* | 2/2003 | O'Brien, Jr. | 370/352 |
| 2003/0088421 A1* | 5/2003 | Maes et al. | 704/270.1 |
| 2003/0228861 A1* | 12/2003 | Leung et al. | 455/412.1 |
| 2004/0073928 A1* | 4/2004 | Alakoski et al. | 725/62 |
| 2004/0102182 A1* | 5/2004 | Reith et al. | 455/410 |
| 2004/0107360 A1* | 6/2004 | Herrmann et al. | 713/201 |
| 2004/0131042 A1* | 7/2004 | Lillie et al. | 370/351 |
| 2004/0181689 A1* | 9/2004 | Kiyoto et al. | 713/201 |
| 2004/0230659 A1* | 11/2004 | Chase | 709/206 |
| 2005/0198299 A1* | 9/2005 | Beck et al. | 709/226 |
| 2005/0232222 A1* | 10/2005 | McConnell et al. | 370/349 |
| 2006/0034266 A1* | 2/2006 | Harris et al. | 370/356 |
| 2006/0171378 A1* | 8/2006 | Harris et al. | 370/352 |
| 2006/0187900 A1* | 8/2006 | Akbar | 370/352 |
| 2007/0019625 A1* | 1/2007 | Ramachandran et al. | 370/352 |
| 2007/0094712 A1* | 4/2007 | Gibbs et al. | 726/3 |
| 2007/0110043 A1* | 5/2007 | Girard | 370/352 |
| 2007/0242659 A1* | 10/2007 | Cantu et al. | 370/352 |
| 2008/0034401 A1* | 2/2008 | Wang | 726/1 |
| 2008/0056241 A1* | 3/2008 | Haddad et al. | 370/352 |
| 2009/0323636 A1* | 12/2009 | Dillon et al. | 370/331 |
| 2010/0074267 A1* | 3/2010 | Ladd | 370/401 |
| 2010/0281162 A1* | 11/2010 | Venkatraman et al. | 709/224 |

* cited by examiner

*Primary Examiner* — Fan Tsang
*Assistant Examiner* — Kharye Pope
(74) *Attorney, Agent, or Firm* — Kilpatrick Townsend & Stockton LLP

(57) ABSTRACT

Systems, methods, and machine-readable media are disclosed for providing enhanced features to a Internet streaming system. In one embodiment, a method of providing customized enhanced features to a streaming communication system such as provided via, for example, a SIP system can comprise identifying one or more parties to an exchange. A type of communication represented by the exchange over the streaming system can be identified. One or more policies applicable to the exchange can be determined and the policies can be enforced to provide the one or more enhanced features. The one or more enhanced features can include for example, services for authenticating, authorizing, and/or anonymizing one or more of the parties to the exchange, services for logging information related to the exchange, services for billing one or more parties to the exchange, and/or any number of other services.

45 Claims, 9 Drawing Sheets

SERVICE PROVIDER FUNCTIONALITY WITH POLICY ENFORCEMENT FUNCTIONAL LAYER BOUND TO SIP

BACKGROUND OF THE INVENTION

Embodiments of the present invention relate generally to communications in a network and more particularly to providing enhanced features to an Internet streaming system.

Session Initiation Protocol (SIP) is an application-layer signaling protocol commonly used for establishing sessions over an Internet Protocol (IP) network. Such a session can be used for a variety of purposes such as Internet telephony, e.g., Voice over Internet Protocol (VoIP), audio and/or video conferencing, interactive gaming, etc. Generally speaking, SIP can be used by an initiating device to request a location of another device to be contacted or connected.

Internet protocol Multimedia Subsystem (IMS) is a system proposed by the Third Generation Partnership Project (3GPP) providing VoIP services. Similar versions have been specified by other standard bodies like the International Telecommunications Union (ITU), European Telecommunications Standards Institute (ETSI), Telecoms and Internet converged Services and Protocols for Advanced Networks (TISPAN), Third Generation Partnership Project 2 (3GPP2), etc. Generally speaking IMS includes an architecture implemented or built upon a SIP system. The intention of IMS is to provide enhanced features, such as generally provided addition security, quality of service, policy management, and other features to SIP. For example, IMS proposes to provide authentication, authorization, logging, billing, and other services.

However, IMS provides an architecture that is extremely complex and difficult and/or costly to implement. Furthermore, the components of IMS are hard-coded with pre-defined, standard elements and the relationships between each element pre-defined in a rigid architecture. As such, IMS is inflexible and not easily extensible. Hence, there is a need for methods and systems that provide enhanced features to a VoIP, SIP, or other streaming system but in a more easily implemented and more extensible architecture than IMS.

BRIEF SUMMARY OF THE INVENTION

Systems, methods, and machine-readable media are disclosed for providing enhanced features to an Internet streaming system such as SIP, VoIP, etc. In one embodiment, a method of providing customized enhanced features to an Internet streaming system such as provided via, for example, a SIP system can comprise identifying one or more parties to an exchange, charging for the exchange, providing Quality of Service (QoS) according to a Service Level Agreement (SLA), and/or other functions, features, or service. A type of communication represented by the exchange over the Internet streaming system can be identified. The type of communication can comprise, for example, a session initiation message. However, such exchanges are not limited to session initiation or call control or routing but can also include any of the exchanges (responses and further requests) that may be used to setup the session, query its status, or modify or terminate it. The type of communication can also comprise a streaming session, i.e., the media data exchanged and controlled by session control information as already mentioned. The streaming session can comprise a multimedia streaming session. In another example, the type of communication can comprise a text-based message.

One or more policies applicable to the exchange can be determined and the policies can be enforced to provide the one or more enhanced features described herein. Each of the one or more policies can comprise a logical combination of one or more conditions and one or more actions. The one or more enhanced features can include for example, services for authenticating, authorizing, and/or anonymizing one or more of the parties to the exchange, services for logging information related to the exchange, charging one or more parties to the exchange, and/or any number of other services. Determining one or more policies applicable to the exchange can be based on the type or level of communication represented by the exchange, an identity of at least one of the parties to the exchange, and/or other criteria.

According to one embodiment, the exchange, i.e., the session and/or media, between the parties can be intercepted. This can be done in multiple places, including but not limited to, on the path of the incoming session/routing control, (e.g. proxy router or when the proxy makes a request for a location or when a response from a location service is returned), in front of the target of the message, and/or in front of the sender/responder. Additionally or alternatively, this can also be on the path of the media controlled by the session control, call control, or routing layer. This can be at the level of: sender, receiver, and/or intermediary (e.g. gateway, media server, etc. that process it).

To provide function as discussed herein, policies can delegate tasks to some network components. For example, tasks can be delegated to a media server or other endpoint that serves or processes media, does media conversion in real time, or broadcast/multicast media. In another example, tasks can be delegated to a firewall. In such a case, policies can allow for control of what passes through the firewall. That is, when traffic is received at the firewall, it checks the applicable policies.

According to one embodiment, a determination can be made as to whether additional parameters to be passed with a SIP message or media stream are required to enforce the policies. In response to determining additional parameters are required to enforce the policies, the additional parameters can be obtained via an out-of-band channel. Additionally or alternatively, in response to determining additional parameters are required to enforce the policies, the additional parameters can be obtained via information from a header of a packet from the exchange and/or from a payload of a packet from the exchange at the session level or the media exchange level.

According to yet another embodiment, a system such as a SIP system, for example, can comprise a communication network and a first communication node communicatively coupled with the communication network. This can be multiple places, including but not limited to, on the path of the incoming session/routing control, (e.g. proxy router or when the proxy makes a request for a location or when a response from a location service is returned), in front of the target of the message, and/or in front of the sender/responder. Additionally or alternatively, this can also be on the path of the media controlled by the session control, call control, or routing layer. This can be at the level of: sender, receiver, and/or intermediary (e.g. gateway, media server, etc. that process it). The first communication node can be adapted to send messages via the communications network. The system can also include a second communication node communicatively coupled with the communication network and adapted to receive the messages from the first communication node. A policy enforcer can be communicatively coupled with the communication network. The policy enforcer can be adapted to identify at least one of the first communication node and the second communication node, identify a type of communication represented by the messages, determine one or more policies applicable to the communication represented by the messages, and enforce the policies to provide one or more enhanced features. The one or more policies can comprise a logical combination of one or more conditions and one or more actions. The one or more enhanced features can include for example, services for authenticating, authorizing, and/or anonymizing one or more of the parties to the exchange, services for logging information related to the exchange, charging one or more parties to the exchange for the exchange, providing Quality of Service (QoS) according to a Service Level Agreement (SLA), and/or any number of other services.

According to one embodiment, the policy enforcer can be further adapted to determine whether additional parameters are required to enforce the policies prior to enforcing the policies. If additional parameters are required, the policy enforcer can be further adapted to obtain the additional parameters via an in-band or out-of-band channel. Alternatively of additionally, the policy enforcer can be further adapted to obtain the additional parameters via information from a header of a packet and/or via information from a payload of a packet from the messages from the messages from the first communication node in response to determining additional parameters are required to enforce the policies.

Additionally or alternatively, the system can also include one or more bindings communicatively coupled with the policy enforcer and one or more enablers. Each enabler can be communicatively coupled with at least one binding. The enablers can interact with the policy enforcer via the bindings and each enabler can be adapted to provide an additional communication function.

According to yet another embodiment, a system, such as a SIP system, can comprise a communication network and a first user agent communicatively coupled with the communication network. The first user agent can be adapted to send session, routing, signaling, and/or media messages via the communications network. The system can also include a second user agent communicatively coupled with the communication network. The second user agent can be adapted to receive the messages from the first user agent. The second user agent can include a policy enforcer adapted to identify at least one of the first user agent and the second user agent and identify a type of communication represented by the messages. The type of communication can comprise a session initiation message, a streaming session (voice, video, etc.), multimedia streaming session, text-based message, or other type of message.

The second user agent can also determine one or more policies applicable to the communication represented by the messages, and enforce the policies to provide one or more enhanced features. The one or more policies can comprise a logical combination of one or more conditions and one or more actions. The one or more enhanced features can include for example, services for authenticating, authorizing, and/or anonymizing one or more of the parties to the exchange, services for logging information related to the exchange, services for charging one or more parties to the exchange for the exchange, providing Quality of Service (QoS) according to a Service Level Agreement (SLA), and/or any number of other services.

DETAILED DESCRIPTION OF THE INVENTION

Figure 1:
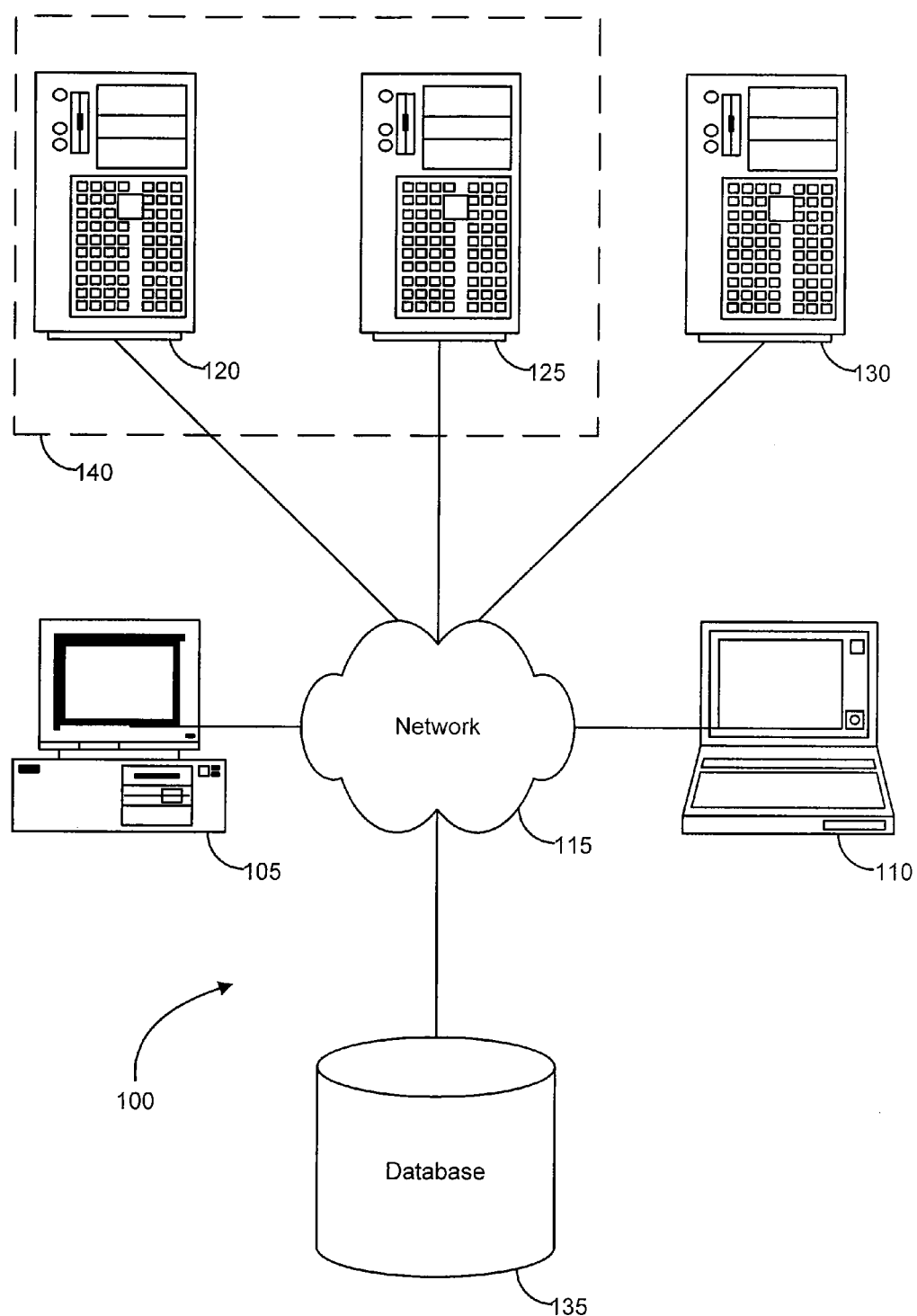
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form. Importantly, it should be noted that while described herein with reference to SEP, embodiments of the present invention are considered to be equally applicable to other protocols and should not be considered limited to use with SIP. More specifically, embodiments of the present invention are thought to be equally applicable to other packet-based protocols suitable for providing Internet streaming communications and abstract the underlying network infrastructure details (i.e. a la NGN—Next Generation Networks). Furthermore, it should be noted that, while specific examples described herein relate to receiving and routing a request to initiate a communication, such examples should not be considered limiting. Rather, it should be understood that any message between endpoints using a suitable protocol can be routed using various embodiments of the present invention.

Embodiments of the present invention provide methods, system and machine-readable media for providing enhanced features to an Internet streaming system. As will be seen, these enhanced features can include, but are not limited to, features such as those provided by Internet protocol Multimedia Subsystem (IMS), Signaling System 7 (SS7), and/or other protocols directed to providing security, identity management, and traditional telephone-like features to VoIP services. However, methods and systems provided herein are directed to providing such features in a compact architecture that is easy to implement and extend and compatible with direct Internet-like SIP or other deployments that can widely interoperated within as well as across domains.

According to one embodiment, providing customized and/ or enhanced features to an Internet streaming system, such as provided via, for example, a SIP system, can comprise identifying one or more parties to an exchange. A type of communication represented by the exchange over the Internet streaming system can be identified. The type of communication can comprise, for example, a session initiation message. However, such exchanges are not limited to session initiation or call control or routing but can also include any of the exchanges (responses and further requests) that may be used to setup the session, query its status, or modify or terminate it. The type of communication can also comprise a streaming session, i.e., the media data exchanged and controlled by session control information as already mentioned. The streaming session can comprise a multimedia streaming session. In another example, the type of communication can comprise a text-based message.

One or more policies applicable to the exchange can be determined and the policies can be enforced to provide the one or more enhanced features. Each of the one or more policies can comprise a logical combination of one or more conditions and one or more actions. As will be seen, application or enforcement of these policies on the messages exchanged between parties to a communication can cause the communication to act in a manner consistent with one or more of the enhanced features. The one or more enhanced features can include for example, services for authenticating, authorizing, and/or anonymizing one or more of the parties to the exchange, services for logging information related to the exchange, services for services for charging one or more parties to the exchange for the exchange, providing Quality of Service (QoS) according to a Service Level Agreement (SLA), and/or any number of other services.

According to one embodiment, the policies can be enforced by intercepting messages exchanged between parties to a communication. That is, the exchange between the parties can be intercepted and one or more policies applicable to the exchange can be determined based on the type of communication represented by the exchange, an identity of at least one of the parties to the exchange, and/or other criteria. Alternatively or additionally, policies can be enforced on a communication by request of one or more of the parties to the communication. In such a case, determining one or more policies applicable to the exchange can be based on the request.

To provide function as discussed herein, policies can delegate tasks to some network components. For example, tasks can be delegated to a media server or other endpoint that serves or processes media, does media conversion in real time, or broadcast/multicast media. In another example, tasks can be delegated to a firewall. In such a case, policies can allow control of what can pass through the firewall. That is, when traffic is received at the firewall, it checks the applicable policies.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/ Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/ or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
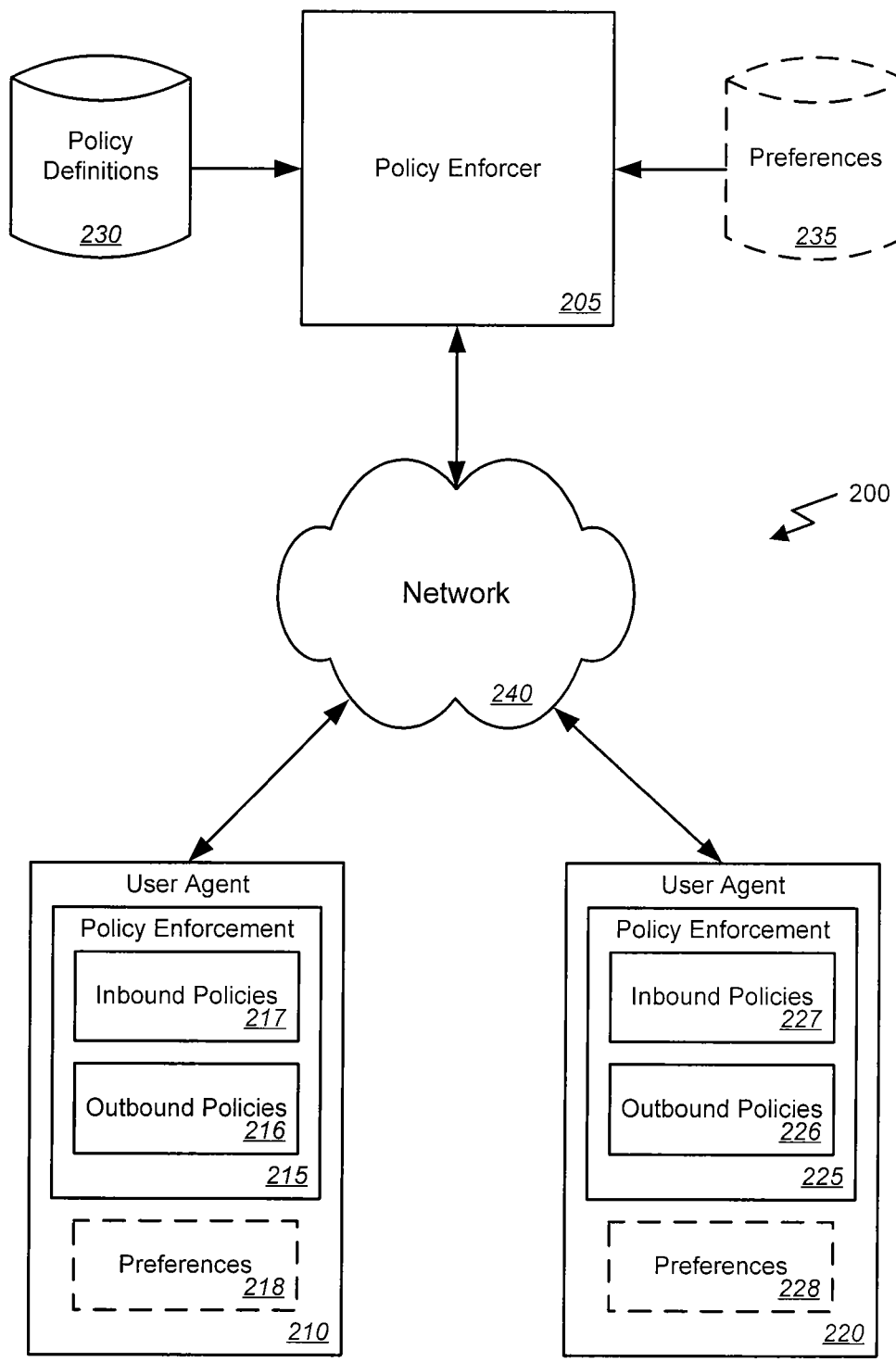
FIG. 2 is a block diagram illustrating, at a high level, components of a system for providing enhanced features to an Internet streaming system according to one embodiment of the present invention.

FIG. 2 is a block diagram illustrating, at a high level, components of a system for providing enhanced features to a Voice over Internet Protocol (VoIP) system according to one embodiment of the present invention. In this example, the system 200 can comprise a communication network 240 such as the Internet or any other LAN, WAN, or other wired or wireless network as discussed above. A first user agent 210 and a second user agent 220 can be communicatively coupled with the communication network 240. It should be noted that, while only two user agents 210 and 220 are illustrated here for the sake of simplicity, in an actual implementation, any number of user agents may be used. The first user agent 210 and second user agent 220 can be adapted to send and receive messages via the communications network 240. It should also be noted that, while discussed below as either sending or receiving, these roles are not exclusive to either user agent 210 and 220. Rather, either user agent 210 or 220 may, at any given point in time, send or receive and in actual use perform both function. It should be noted that, rather than being limited to the use of the first user agent 210 and second user agent 220 sending or receiving messages, other endpoints or intermediaries in the exchange, such as servers, applications, or other communication nodes can also be utilized.

The system 200 can also include a policy enforcer 205 communicatively coupled with the communication network 240. As will be seen, the policy enforcer can be implemented in any number of one or more locations in the system. For example, the policy enforcer can be implemented in or on one or more of a location server 345, a gateway 330, a proxy router 325, between 375 and 380 senders and receivers, etc. According to one embodiment of the present invention, the policy enforcer 205 can be adapted to intercept the messages from the first user agent 210 to the second user agent 220 or, in some cases between any user agents or other elements of the system 200. Based on these intercepted messages, the policy enforcer 205 can identify at least one of the first user agent 210 and the second user agent 220 as well as identify a type of communication represented by the messages. The policy enforcer 205 can then determine one or more policies applicable to the communication based on the type of communication represented by the messages. Additionally or alternatively, the policy enforcer 205 can determine one or more policies applicable to the exchange based on an identity associated with at least one of the first user agent 210 and the second user agent 220, the type and/or level of communication intercepted, and/or any other of a number of criteria. That is, the policy enforcer 205, upon intercepting a message exchanged between the user agents 210 and 220, can determine based on the information from the message, or other additional information as will be seen, policies that should be applied to the communications between the user agents 210 and 220. These policies can be stored, for example, in a policy definition store 230 either within or separate from the policy enforcer 205. Additionally or alternatively, policy enforcer 205 selection of applicable policies may be based on one or more user preferences associated with either or both of the user agents 210 and 220 and stored, for example, in a preference store 235 or database. These preferences may include, for example, information related to forwarding, call barring or routing of communications, identity management information, information related to specific features such as "Do-Not-Disturb" settings, etc.

Once the policy enforcer has identified policies applicable to the communication between the user agents 210 and 220, the policy enforcer 205 can enforce the policies to provide one or more enhanced features. The one or more policies can comprise a logical combination of one or more conditions and one or more actions. Therefore, policy enforcement can be achieved by evaluating the conditions and executing the actions within the policy enforcer 205 and/or, as will be discussed below, by delegating some or all enforcement tasks to various other enablers, enforcers, or other entities. The one or more enhanced features can include, but are not limited to, services for authenticating, authorizing, and/or anonymizing one or more of the parties to the exchange, services for logging information related to the exchange, charging one or more parties to the exchange for the exchange, providing Quality of Service (QoS) according to a Service Level Agreement (SLA), and/or any number of other services.

Alternatively or additionally, the policy enforcer 205 can be adapted to receive a request for policy enforcement from one or both of the user agents 210 and 220 prior to selecting policies to be enforced. That is, rather than or in addition to intercepting communications between the user agents 210 and 220, the profile enabler 205 can be adapted to receive requests from either or both of the user agents 210 and 220 requesting the application of policies to the communication. In such a case, the policy enforcer 205 can identify at least one of the first user agent 210 and the second user agent 220 based on the request. Furthermore, the policy enforcer 205 can identify the type of communication based on the request and/or determine one or more policies applicable to the communication based on the request.

According to one embodiment, the policy enforcer 205 can be further adapted to determine whether additional parameters are required or may be useful to select or enforce the policies. That is, in addition to information from the messages intercepted by the policy enforcer 205, or from the requests to the policy enforcer 205, or from optional preference information accessible by the policy enforcer 205, still other parameters may be considered by the policy enforcer 205 in selecting or enforcing a policy. If additional parameters are required, the policy enforcer 205 can be further adapted to obtain the additional parameters from the user agents 210 and 220 or other sources via an out-of-band channel. Alternatively of additionally, the policy enforcer 205 can be further adapted to obtain the additional parameters via information from a header of a packet and/or via information from a payload of a packet from the messages from the messages from the user agents 210 and 220 in response to determining additional parameters are required to enforce the policies.

According to yet another embodiment, the first user agent 210 and/or the second user agent 220 can include policy enforcement modules 215 and 225 respectively. These policy enforcement modules 215 and 225 can include inbound policies 217 and 227 applicable to communications received by the user agent 210 or 220 as well as outbound policies 216 and 226 applicable to communications being sent from the user agent 210 or 220. The policies of the policy enforcement modules 215 and 225 can be applied to communications between the user agents 210 and 220 instead of or in addition to those, if any, applied by the policy enforcer 205.

The elements of the system 200 illustrated in FIG. 2 may be implemented in any of a variety of different environments or architectures. Exemplary architectures suitable for such implementations are disclosed in U.S. patent application Ser. No. 11/383,024 entitled "SIP Routing Customization" filed on May 12, 2006 which is herein incorporated by reference in its entirety for all purposes. A portion of this disclose is reproduced below for convenience.

Figure 3:
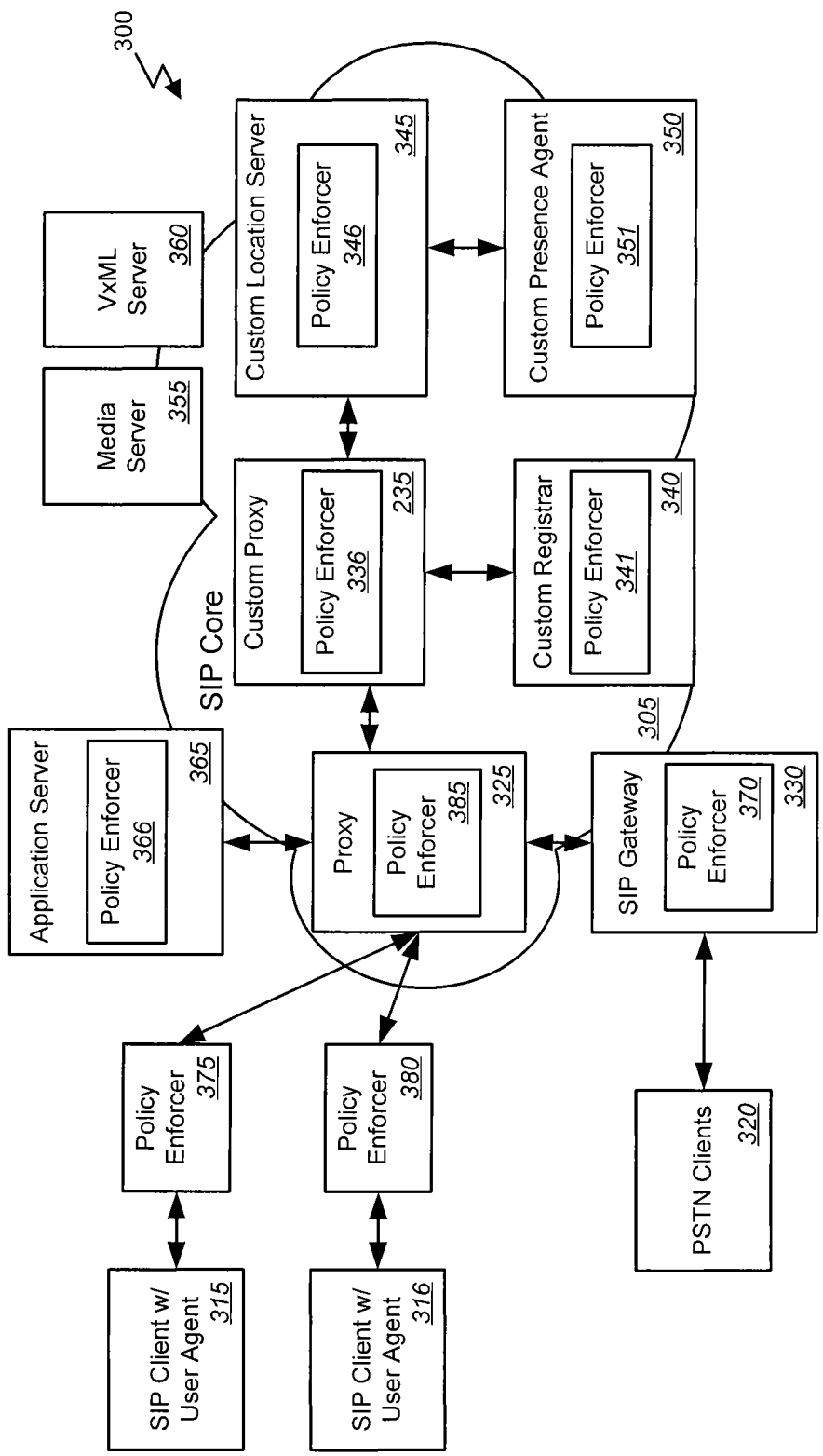
FIG. 3 is a block diagram illustrating functional components of a system for providing policy enforcement according to one embodiment of the present invention.

FIG. 3 is a block diagram illustrating functional components of a system for providing policy enforcement according to one embodiment of the present invention. This example represents, conceptually, components that may be implemented in an environment such as described above with reference to FIG. 1 or 2 or any other suitable environment.

In this example, the system 300 includes a SIP core 305 and a number of clients such as SIP clients 315, Public Switched Telephone Network (PTSN) clients 320, etc. The SIP core 305 can provide access to one or more servers 355-365 and/or can route messages or signals between the clients 310-320 and/or the servers 355-365. As is common, the SIP core 305 can receive messages or signals from the clients via a proxy 325 or, as in the case of PSTN clients, via a SIP gateway 330 and the proxy 325.

According to one embodiment, the SIP core 305 can also include a number of customized or modified components such as a custom proxy 335 and a custom location server 345. The system can further comprise a custom registrar 340 adapted to store one or more addresses of record for the endpoints such as client devices, servers etc. However, rather than storing a single target SIP URI as is common with a typical SIP registrar, the custom registrar 340 can be adapted to store multiple target SIP URIs. Additionally or alternatively, the custom registrar 340 may be adapted to store, set, or otherwise modify one or more policies related to the target SIP URIs. According to one embodiment, the components for providing such customization may be implemented in an application server 365. That is, the custom elements, i.e., the custom registrar 340, custom proxy 335, custom location server 345, and custom presence agent 350, can be implemented as one or more applications executing on an application server 365 and available to the SIP core 305.

The custom proxy 335 can be adapted to receive a request, for example via proxy 325, to establish a session with a target device. The customized location server 345 can be adapted to determine, in response to receiving a query from the custom proxy 335, one or more target SIP URIs for the target AOR/device from stored target SIP URIs or policy scripts executed by the custom proxy 335. The customized location server 345 can also be adapted to apply one or more policies to the one or more SIP URIs for the target AOR/device via a policy enforcement module 346. Alternatively or additionally, these policies can be applied by any or all of a policy enforcement module 336 of the custom proxy 335, a policy enforcement module 341 of the custom registrar 340, a policy enforcement module 351 of the custom presence agent, and/or a policy enforcement module 366 of the application server 365. That is, rather than simply returning a discovered target SIP URI, the customized location server 345 can apply policies to the target SIP URI(s) to modify the target SIP URI(s) returned. As will be seen, this provides much greater flexibility and functionality over the standard SIP location server.

The one or more policies applied by the customized location server 345 can comprise a set of one or more conditions and one or more actions associated with each condition. For example, the one or more policies can include one or more conditions based on preferences for a user of the target endpoint, one or more conditions based on calendar information for a user of the target endpoint, one or more conditions based on presence of a user on the target endpoint or another endpoint, one or more conditions based on a user of the target endpoint being authenticated, one or more conditions based on a user of the target endpoint being authorized to receive a message, such as by having paid a fee. In such a case, a check can be performed to determine whether the sender is authorized to send based on having paid a fee, not being blacklisted, being authorized by the target user, etc.

Determining one or more target SIP URIs for the target AOR/endpoint and applying one or more policies to request one or more target SIP URIs for the target AOR/endpoint can be performed by the customized location server 345 while routing the request to establish a session with the target endpoint can be performed by the custom proxy 235 of the SIP system. Policies can be applied when registering at the custom location server 245, when requesting addresses from the custom location server 345, and/or at the custom proxy 335 when scripts or policies are passed from the custom location server 345 in answer to a request. It should be noted that the policies of the latter type can remain on the custom proxy 345 for the duration of a session or for one exchange. For caching purpose, they could stay longer. In some environments, the policies could be cached across sessions and endpoints or even be pre-compiled in the custom proxy 335.

Therefore, when registering, the custom registrar 340 can load information into the custom location server 345. A policy may apply to this information and can result in changing the target SIP URI. Alternatively, the metadata can be associated with the target SIP URI defining policies that are specific to it, if any. This may be based on how, when and who registered, information passed during registration (e.g. via SIP header as a URI), etc.

When an endpoint requests a target SIP URI, such as be issuing a message to another endpoint, the custom location server 345 can return the taregt SIP URI, a modified target SIP URI, a list of target SIP URIs with a navigation flow (e.g. parallel (e.g. SIP forking), series, . . . ), or a script to run on the custom proxy 335 that can be passed with the target SIP URI (as metadata) or instead of the target SIP URI. Alternatively, if policy enforcement is done in the custom proxy 335,then nothing needs to be passed. As noted above, scripts may includes routing scripts as well as header manipulation instructions as well as any other operation described in the policy. The custom proxy 335 may execute policies that it has locally (e.g., loaded by administrator) or that it has obtained as a script with or instead of target SIP URIs when interrogating the custom location server 345. These policies may apply also on firewall/media gateway—i.e. on the media stream as with a Realtime Transfer Protocol (RTP) programmable/policy based firewall. The firewall may check with the proxy or policy enforcer to determine if a policy applies the media stream between IP addresses and ports that are involved.

When the custom proxy 335 is present for a session, the custom proxy 335 can act as a B2B User Agent or as a third party call control between the endpoints. In the latter case, it acts like a middleman and it behaves for each endpoint as if it was the other endpoint. In this way, all messages come back and forth to the custom proxy 335. As such, the custom proxy 335 updates headers and addresses of the messages appropriately. In the former case header manipulation takes place to ensure that responses pass through.

In some cases, the system 300 may also have a custom presence agent 350 adapted to determine presence of a user on the target endpoint or another endpoint. That is, by monitoring various endpoints and/or messages, the custom presence agent 350 can detect the use of one of the endpoints. Furthermore, the custom presence agent 350 can be adapted to influence application of the one or more policies to the one or more AORs for the target endpoint by the customized location server 345 based on the presence of the user. So, for example, the policy can request to check presence of the user through the custom presence agent 350 and change the target SIP URI(s) returned accordingly. The custom presence agent 350 or presence server can be a user agent that can apply policies on any: subscription, updates or publications. A custom presence agent 350 or presence server can be interrogated with the location server and deal with responses that may be about multiple target SIP URIs or policies themselves to determine presence updates or to run for the particular principal presence. For example, the custom presence agent 350 can determine how to determine what presence attributes to update if the principal uses different devices with different states, when to update based, for example, on preferences, when to use or route other messages (e.g. email, SMS, or others), etc. Alternatively, this endpoint may be considered busy and another target SIP URI may be selected as the first to contact. This can be accomplished by the proxy executing the taregt SIP URI(s) or script/policy appropriately. That is, the proxy can detect the failed message and issue a new one if prescribed by the target SIP URIs or by the received policy script. It should be noted that the proxy can also act as a SIP forking proxy and act per the policies on messages to allow multiple endpoints to receive invite or other messages and to interact.

The custom proxy 335 can be further adapted to route the request to establish a session with the target device based on results of the customized location server 345 applying the one or more policies to the one or more target SIP URIs for the target device. That is, rather than simply routing to a discovered target SIP URI returned by the location server, the custom proxy can be adapted to deal with multiple target SIP URIs or policy/scripts returned by the custom location server 345. For example, the custom location server 345, after applying policies to the stored target SIP URIs for a particular device may return multiple target SIP URIs to be contacted, perhaps even in a specified order. The custom proxy 335 can be adapted to route messages to each device represented by the target SIP URIs in a manner indicated by the custom location server 345 (e.g. SIP forking or other behaviors).

Therefore, rather than simply returning a stored target SIP URI in response to a signal or message, the custom proxy 335 and customized location server 345, as well as the custom registrar 340 and/or custom presence agent 350 in some cases, provide for the application of one or more policies to the target SIP URIs. As mentioned above, the policies can comprise one or more conditions for each target SIP URIs with one or more rules associated with each condition. Such conditions and rules can take a wide variety of forms to perform any number of different tasks. Some possibilities are now offered by way of example and not limitation.

According to one embodiment, the system 300 can, as mentioned above, provide presence based routing. That is, the custom location server 345 can have a policy to check the presence and decide what target SIP URI(s) to return accordingly. So, for example, the custom location server 345 can subscribe to the custom presence agent 350. Changes of presence can be reflected in the custom location server 345 as, for example, metadata passed to the custom location server from the custom presence agent. This allows the custom location server 345 to respond faster without having to make a query. In such cases, policies associated with presence updates may be implemented to change the stored target SIP URIs. In another embodiment, the system 300 can check user preferences and, based on these preferences, return one or more target SIP URIs to invite in parallel, sequentially, or conditionally sequentially to implement for example: a group invite; a "Follow me" function; a "Find me" or "Hunt" function; etc. Furthermore, the preferences and/or presence information, together or individually, may provide for a guess of a "best" AOR based on calendar and/or other information and/or based on physical location derived otherwise and made available in a physical location server. According to one embodiment, these functions can be achieved by the custom proxy based on the policy or scripted returned by the custom location server when an target SIP URI is requested.

In another example, the system 300 can provide for authenticating and/or authorizing requests. For example, the system 300 may return no target SIP URI, i.e., a rejection message, if the requester and/or the target are not authentic and/or authorized to transact on the system. In some cases, authorization may be based on the requester and/or the target paying a fee for the transaction or service, or preferences. Alternatively or additionally, authorization may be based on privacy rules, such as those defining who can access the information, or preferences, such as those defining a "do not disturb" period between specified times, or when the user is on a specified system, or when the user is at home, etc. In the case of paying a fee, the service provider managing the system 300 may charge for an invite or message, may require subscription, or check successful charging (pre-pay) or check for successful reserve (post pay/credit card payments) or check account status etc. In such a case, the custom location server 345 may, for example, pass a charging request to a charging enabler that generates a charging record to a billing or payment system and check the results.

In other embodiments, the system 300 may additionally or alternatively log signals to and/or from the custom proxy 335. In some cases, the system 300 may anonymize requests with respect to the requester and/or the target. So, in general, the system 300 can execute policies that affect the target SIP URI, or other data in the system 300.

In addition to instead of the custom routing functions described above, the policy enforcer 336 of the custom proxy 235 and/or any of the other policy enforcers 341, 346, 351, and/or 366 may be adapted to implement policy enforcement to provide enhanced features as described above. That is, the policy enforcer 336 can be adapted to intercept the messages user agents operating, for example, on the clients 315 and 316, and based on these intercepted messages, identify at least one of the user agents as well as identify a type of communication represented by the messages. The policy enforcer 336 can then determine one or more policies applicable to the communication based on the type of communication represented by the messages. Additionally or alternatively, the policy enforcer 336 can determine one or more policies applicable to the exchange based on an identity associated with at least one of the user agents. That is, the policy enforcer 336, upon intercepting a message exchanged between the user agents, can determine based on the information from the message, or other additional information as will be seen, policies that should be applied to the communications between the user agents. Once the policy enforcer 336 has identified policies applicable to the communication between the user agents, the policy enforcer 336 can enforce the policies to provide one or more enhanced features.

Alternatively or additionally as described above, the policy enforcer 336 can be adapted to receive a request for policy enforcement from user agents prior to selecting policies to be enforced. That is, rather than or in addition to intercepting communications between the user agents, the profile enabler 336 can be adapted to receive requests from the user agents requesting the application of policies to the communication. In such a case, the policy enforcer 336 can identify at least one of the user agents based on the request. Furthermore, the policy enforcer 336 can identify the type of communication based on the request and/or determine one or more policies applicable to the communication based on the request.

As noted above, to provide functions as discussed herein, policies can delegate tasks to some network components. For example, tasks can be delegated to a media server 355, application server 365 or other endpoint that serves or processes media, does media conversion in real time, or broadcast/multicast media. In another example, tasks can be delegated to a firewall (not shown here). In such a case, policies can allow control of what can pass through the firewall. That is, when traffic is received at the firewall, it checks the applicable policies. Such a firewall may be implemented, for example, as described in U.S. patent application Ser. No. 11/512,585, entitled "Cross-Network Layer Correlation-Based Firewalls" filed on Aug. 29, 2006 which is incorporated herein by reference in its entirety.

Additionally or alternatively, tasks can be delegated to a SIP/PSTN gateway 330, SIP/PBX gateway (not shown here), or a router such as described in U.S. patent application Ser. No. 11/475,280, entitled "Techniques for Correlation of Charges in Multiple Layers for Content Delivery" filed Jun. 26, 2006 which is incorporated herein by reference in its entirety. In such a case, correlation (i.e., packet charging) can be enforced by the policies and charges via a charging enabler in the service layer based on the policies and lined to the associated service transaction (i.e., which SIP session etc.) can be provided. Additionally or alternatively, Quality of Service (QoS) can be maintained by a traffic interceptor that looks up and determines QoS and routes based on available information or pass a message along with QoS information to a load balancer.

However, the example illustrated in FIG. 3 assumes that the SIP core can be modified to provide such features. In many cases, the SIP core is provided as part of an existing network or network element and cannot be easily modified. Therefore, the following alternative is presented for adding the features discussed above to an existing SIP implementation without modifying the SIP core.

Figure 4:
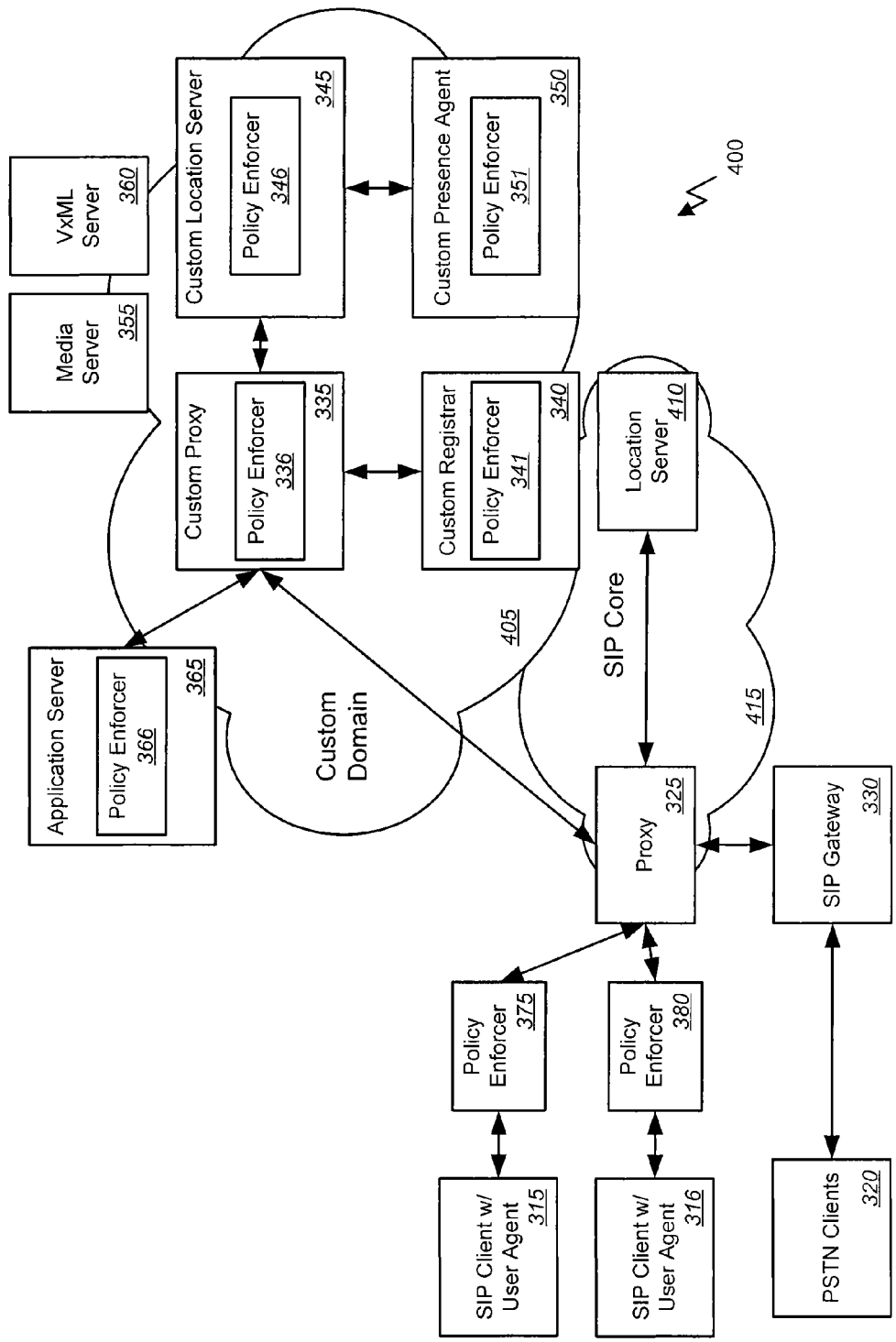
FIG. 4 is a block diagram illustrating functional components of a system for providing policy enforcement according to an alternative embodiment of the present invention.

FIG. 4 is a block diagram illustrating functional components of a system for providing policy enforcement according to an alternative embodiment of the present invention. This example illustrates an existing, unmodified SIP core 415. As in the previous example, the system 400 also includes a number of clients such as SIP clients 315, Public Switched Telephone Network (PTSN) clients 320, etc. As is common, the SIP core 415 can receive messages or signals from the clients via a proxy 325 or, as in the case of PSTN clients 320, via a SIP gateway 330 and the proxy 325. Also as is common, the requests can be routed based on AORs discovered and provided by the location server 410.

According to one embodiment, the target SIP URIs stored in or by the location server 410 can include those pointing to a custom domain 405. That is, an target SIP URI can be stored in the SIP core 415 in the conventional manner, i.e., via a SIP registrar. However, rather than pointing to an end device, the target SIP URI can point to the custom domain 405 and cause the proxy 325 of the SIP core to route or redirect the request to the custom domain 405.

The custom domain 405 can include a number of customized components such as a custom proxy 335 and a custom location server 345. The custom domain 405 can further comprise a custom registrar 340 adapted to store one or more addresses of record for the target device or other devices. That is, the custom components, i.e., the custom proxy 335, custom location server 345, custom registrar 340, and custom presence agent 350, for providing custom routing as discussed above can be implemented in the custom domain 405 rather than by modifying the SIP core 415. However, the custom components of the custom domain 405 can then provide the same functions of custom routing as discussed above with reference to FIG. 3.

That is, rather than storing a single target SIP URI as is common with a typical SIP registrar, the custom registrar 340 of the custom domain 405 can be adapted to store multiple target SIP URIs. Additionally or alternatively, the custom registrar 340 may be adapted to store, set, or otherwise modify one or more policies related to the target SIP URIs. According to one embodiment, the components for providing such customization may be implemented in an application server 365. That is, the custom elements, i.e., the custom registrar 340, custom proxy 335, custom location server 345, and custom presence agent 350, can be implemented as one or more applications executing on an application server 365 and available to the custom domain 405.

According to one embodiment, the target SIP URIs stored in or by the location server 410 of the SIP core 415 can include those pointing to the custom domain 405. That is, a target SIP URI can be stored in the location server 410 of the SIP core 415 in the conventional manner, i.e., via a SIP register. However, rather than pointing to an endpoint, the target SIP URI can point to the custom domain 405 and cause the proxy 425 of the SIP core to route or redirect the request to the custom domain 405.

The custom proxy 335 of the custom domain 405 can be adapted to receive a request, for example via proxy 325, to establish a session with a target device. The customized location server 345 can be adapted to determine, in response to receiving a query from the custom proxy 335, one or more target SIP URIs for the target AOR/device from stored target SIP URIs or policy scripts executed by the custom proxy 335. The customized location server 345 can also be adapted to apply one or more policies to the one or more SIP URIs for the target AOR/device via a policy enforcement module 346. Alternatively or additionally, these policies can be applied by any or all of a policy enforcement module 336 of the custom proxy 335, a policy enforcement module 341 of the custom registrar 340, a policy enforcement module 351 of the custom presence agent, and/or a policy enforcement module 366 of the application server 365. That is, rather than simply returning a discovered target SIP URI, the customized location server 345 can apply policies to the target SIP URI(s) to modify the target SIP URI(s) returned. As will be seen, this provides much greater flexibility and functionality over the standard SIP location server.

The one or more policies applied by the customized location server 345 can comprise a set of one or more conditions and one or more actions associated with each condition. For example, the one or more policies can include one or more conditions based on preferences for a user of the target endpoint, one or more conditions based on calendar information for a user of the target endpoint, one or more conditions based on presence of a user on the target endpoint or another endpoint, one or more conditions based on a user of the target endpoint being authenticated, one or more conditions based on a user of the target endpoint being authorized to receive a message, such as by having paid a fee. In such a case, a check can be performed to determine whether the sender is authorized to send based on having paid a fee, not being blacklisted, being authorized by the target user, etc.

Determining one or more target SIP URIs for the target AOR/endpoint and applying one or more policies to request one or more target SIP URIs for the target AOR/endpoint can be performed by the customized location server 345 while routing the request to establish a session with the target endpoint can be performed by the custom proxy 335 of the custom domain 305 via the proxy 325 of the SIP core 415. Policies can be applied when registering at the custom location server 345, when requesting addresses from the custom location server 345, and/or at the custom proxy 335 when scripts or policies are passed from the custom location server 345 in answer to a request. It should be noted that the policies of the latter type can remain on the custom proxy 345 for the duration of a session or for one exchange. For caching purpose, they could stay longer. In some environments, the policies could be cached across sessions and endpoints or even be pre-compiled in the custom proxy 335.

Therefore, when registering, the custom registrar 340 can load information into the custom location server 345. A policy may apply to this information and can result in changing the target SIP URI. Alternatively, the metadata can be associated with the target SIP URI defining policies that are specific to it, if any. This may be based on how, when and who registered, information passed during registration (e.g. via SIP header as a URI), etc.

When an endpoint requests a target SIP URI, such as be issuing a message to another endpoint, the custom location server 345 can return the target SIP URI, a modified target SIP URI, a list of target SIP URIs with a navigation flow (e.g. parallel (e.g. SIP forking), series, . . . ), or a script to run on the custom proxy 335 that can be passed with the target SIP URI (as metadata) or instead of the target SIP URI. Alternatively, if policy enforcement is done in the custom proxy 335, then nothing needs to be passed. As noted above, scripts may includes routing scripts as well as header manipulation instructions as well as any other operation described in the policy. The custom proxy 335 may execute policies that it has locally (e.g., loaded by administrator) or that it has obtained as a script with or instead of target SIP URIs when interrogating the custom location server 345. These policies may apply also on firewall/media gateway—i.e. on the media stream as with a Realtime Transfer Protocol (RTP) programmable/policy based firewall. The firewall may check with the proxy or policy enforcer to determine if a policy applies the media stream between IP addresses and ports that are involved.

When the custom proxy 335 is present for a session, the custom proxy 335 can act as a B2B User Agent or as a third party call control between the endpoints. In the latter case, it acts like a middleman and it behaves for each endpoint as if it was the other endpoint. In this way, all messages come back and forth to the custom proxy 335. As such, the custom proxy 335 updates headers and addresses of the messages appropriately. In the former case header manipulation takes place to ensure that responses pass through.

In some cases, the system 300 may also have a custom presence agent 350 adapted to determine presence of a user on the target endpoint or another endpoint. That is, by monitoring various endpoints and/or messages, the custom presence agent 350 can detect the use of one of the endpoints. Furthermore, the custom presence agent 350 can be adapted to influence application of the one or more policies to the one or more AORs for the target endpoint by the customized location server 345 based on the presence of the user. So, for example, the policy can request to check presence of the user through the custom presence agent 350 and change the target SIP URI(s) returned accordingly. The custom presence agent 350 or presence server can be a user agent that can apply policies on any: subscription, updates or publications. A custom presence agent 350 or presence server can be interrogated with the location server and deal with responses that may be about multiple target SIP URIs or policies themselves to determine presence updates or to run for the particular principal presence. For example, the custom presence agent 350 can determine how to determine what presence attributes to update if the principal uses different devices with different states, when to update based, for example, on preferences, when to use or route other messages (e.g. email, SMS, or others), etc. Alternatively, this endpoint may be considered busy and another target SIP URI may be selected as the first to contact. This can be accomplished by the proxy executing the target SIP URI(s) or script/policy appropriately. That is, the proxy can detect the failed message and issue a new one if prescribed by the target SIP URIs or by the received policy script. It should be noted that the proxy can also act as a SIP forking proxy and act per the policies on messages to allow multiple endpoints to receive invite or other messages and to interact.

The custom proxy 335 can be further adapted to route the request to establish a session with the target device based on results of the customized location server 345 applying the one or more policies to the one or more target SIP URIs for the target device. That is, rather than simply routing to a discovered target SIP ULRI returned by the location server, the custom proxy can be adapted to deal with multiple target SIP URIs or policy/scripts returned by the custom location server 345. For example, the custom location server 345, after applying policies to the stored target SIP URIs for a particular device may return multiple target SIP URIs to be contacted, perhaps even in a specified order. The custom proxy 335 can be adapted to route messages to each device represented by the target SIP UIRIs in a manner indicated by the custom location server 345 (e.g. SIP forking or other behaviors).

Therefore, rather than simply returning a stored target SIP URI in response to a signal or message, the custom proxy 335 and customized location server 345, as well as the custom registrar 340 and/or custom presence agent 350 in some cases, provide for the application of one or more policies to the target SIP URIs. As mentioned above, the policies can comprise one or more conditions for each target SIP URIs with one or more rules associated with each condition. Such conditions and rules can take a wide variety of forms to perform any number of different tasks. Some possibilities are now offered by way of example and not limitation.

According to one embodiment, the system 300 can, as mentioned above, provide presence based routing. That is, the custom location server 345 can have a policy to check the presence and decide what target SIP URI(s) to return accordingly. So, for example, the custom location server 345 can subscribe to the custom presence agent 350. Changes of presence can be reflected in the custom location server 345 as, for example, metadata passed to the custom location server from the custom presence agent. This allows the custom location server 345 to respond faster without having to make a query. In such cases, policies associated with presence updates may be implemented to change the stored target SIP URIs. In another embodiment, the system 300 can check user preferences and, based on these preferences, return one or more target SIP URIs to invite in parallel, sequentially, or conditionally sequentially to implement for example: a group invite; a "Follow me" function; a "Find me" or "Hunt" function; etc. Furthermore, the preferences and/or presence information, together or individually, may provide for a guess of a "best" AOR based on calendar and/or other information and/or based on physical location derived otherwise and made available in a physical location server. According to one embodiment, these functions can be achieved by the custom proxy based on the policy or scripted returned by the custom location server when an target SIP URI is requested.

In another example, the custom domain 405 can provide for authenticating and/or authorizing requests. For example, the custom domain 405 may return no target SIP URI, i.e., a rejection message, if the requestor and/or the target are not authentic and/or authorized to transact on the system. In some cases, authorization may be based on the requester and/or the target paying a fee for the transaction or service, or preferences. Alternatively or additionally, authorization may be based on privacy rules, such as those defining who can access the information, or preferences, such as those defining a "do not disturb" period between specified times, or when the user is on a specified system, or when the user is at home, etc. In the case of paying a fee, the service provider managing the custom domain 405 may charge for an invite or message, may require subscription, or check successful charging (pre-pay) or check for successful reserve (post pay/credit card payments) or check account status etc. In such a case, the custom location server 245 may, for example, pass a charging request to a charging enabler that generates a charging record to a billing or payment system and check the results.

In addition to instead of the custom routing functions described above, the policy enforcer 336 of the custom proxy 235 and/or any of the other policy enforcers 341, 346, 351, 366, 375, and/or 380 may be adapted to implement policy enforcement to provide enhanced features as described above. That is, a policy enforcer 336 can be adapted to intercept the messages user agents operating, for example, on the clients 315 and 316, and based on these intercepted messages, identify at least one of the user agents and/or identify a type of communication represented by the messages. The policy enforcer 336 can determine one or more policies applicable to the communication based on the type of communication represented by the messages. Additionally or alternatively, the policy enforcer 336 can determine one or more policies applicable to the exchange based on an identity associated with at least one of the user agents. That is, the policy enforcer 336, can determine based on the information from the message, or other additional information as will be seen, policies that should be applied to the communications between the user agents. Once the policy enforcer 336 has identified policies applicable to the communication between the user agents, the policy enforcer 336 can enforce the policies to provide one or more enhanced features.

Alternatively or additionally as described above, the policy enforcer 336 can be adapted to receive a request for policy enforcement from user agents 2prior to selecting policies to be enforced. That is, rather than or in addition to intercepting communications between the user agents, the profile enabler 336 can be adapted to receive requests from the user agents requesting the application of policies to the communication. In such a case, the policy enforcer 336 can identify the user agents based on the request. Furthermore, the policy enforcer 336 can identify the type of communication based on the request and/or determine one or more policies applicable to the communication based on the request.

As noted above, to provide functions as discussed herein, policies can delegate tasks to some network components. For example, tasks can be delegated to a media server 355, application server 365 or other endpoint that serves or processes media, does media conversion in real time, or broadcast/multicast media. In another example, tasks can be delegated to a firewall (not shown here). In such a case, policies can allow control of what can pass through the firewall. That is, when traffic is received at the firewall, it checks the applicable policies. Such a firewall may be implemented, for example, as described in the U.S. patent application entitled "Cross-Network Layer Correlation-Based Firewalls" referenced above.

Additionally or alternatively, tasks can be delegated to a SIP/PSTN gateway 330, SIP/PBX gateway (not shown here), or a router such as described in the U.S. patent application entitled "Techniques for Correlation of Charges in Multiple Layers for Content Delivery" referenced above. In such a case, correlation (i.e., packet charging) can be enforced by the policies and charges via a charging enabler in the service layer based on the policies and lined to the associated service transaction (i.e. which SIP session etc.) can be provided. Additionally or alternatively, Quality of Service (QoS) can be maintained by a traffic interceptor that looks up and determines QoS and routes based on available information or pass a message along with QoS information to a load balancer.

Figure 5:
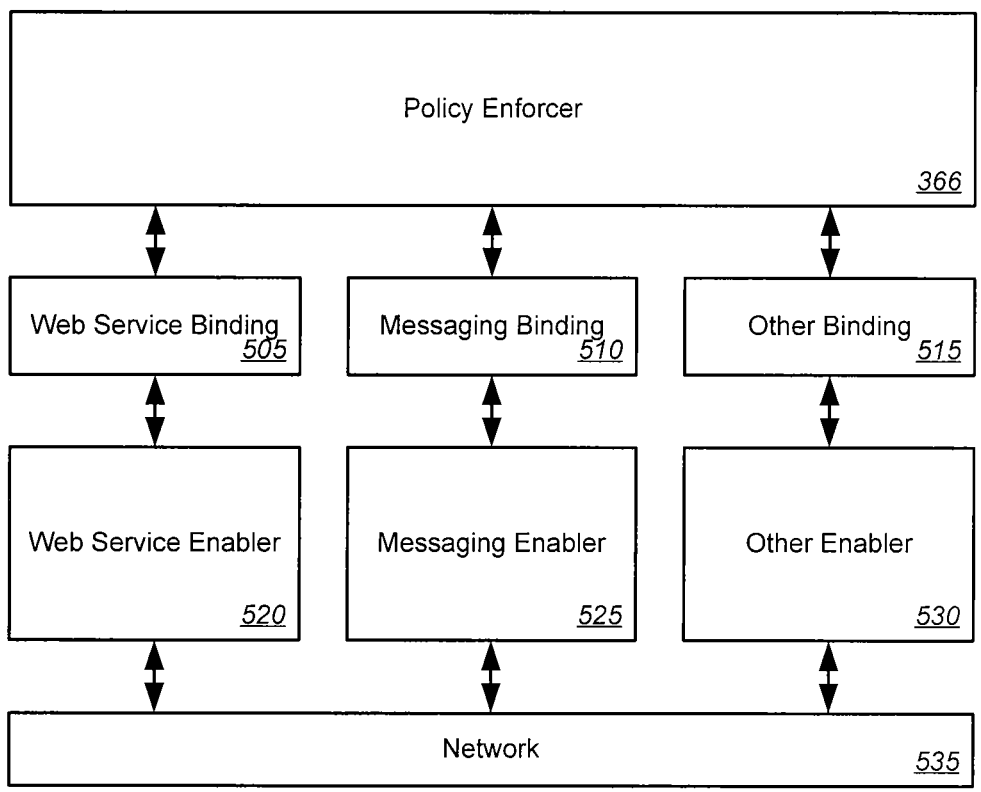
FIG. 5 is a block diagram illustrating additional details of components for providing enhanced features to an Internet streaming system according to another embodiment of the present invention.

As noted above, policy enforcement can be achieved by evaluating the conditions and executing the actions within the policy enforcer and/or by delegating some or all enforcement tasks to various other enablers, enforcers, or other entities. FIG. 5 is a block diagram illustrating additional details of components for providing enhanced features to an Internet streaming system according to another embodiment of the present invention. In this example, the system includes a number of bindings 505-515 communicatively coupled with the policy enforcer 366 and a number of enablers 520-530. Each enabler 520-530 can be communicatively coupled with at least one binder 505-515. The enablers 520-530 can interact with the policy enforcer 366 via the bindings 505-515 and each enabler 520-530 can be adapted to provide an additional communication function. So, for example, a web service enabler 520, via the web service binding 505, can extend the functionality of the policy enforcer 366 and provide web services to other devices or agents on the network 535. Similarly a messaging enabler 525 can provided additional functionality based on policies, processes, information, etc. delegated and/or supplied to the enabler 525 via the messaging binding 510. In this way, the functionality of the policy enabler 366 can be extended to include, for example, functions such as those provided by Signaling System 7 (SS7) or other protocols.

Figure 6:
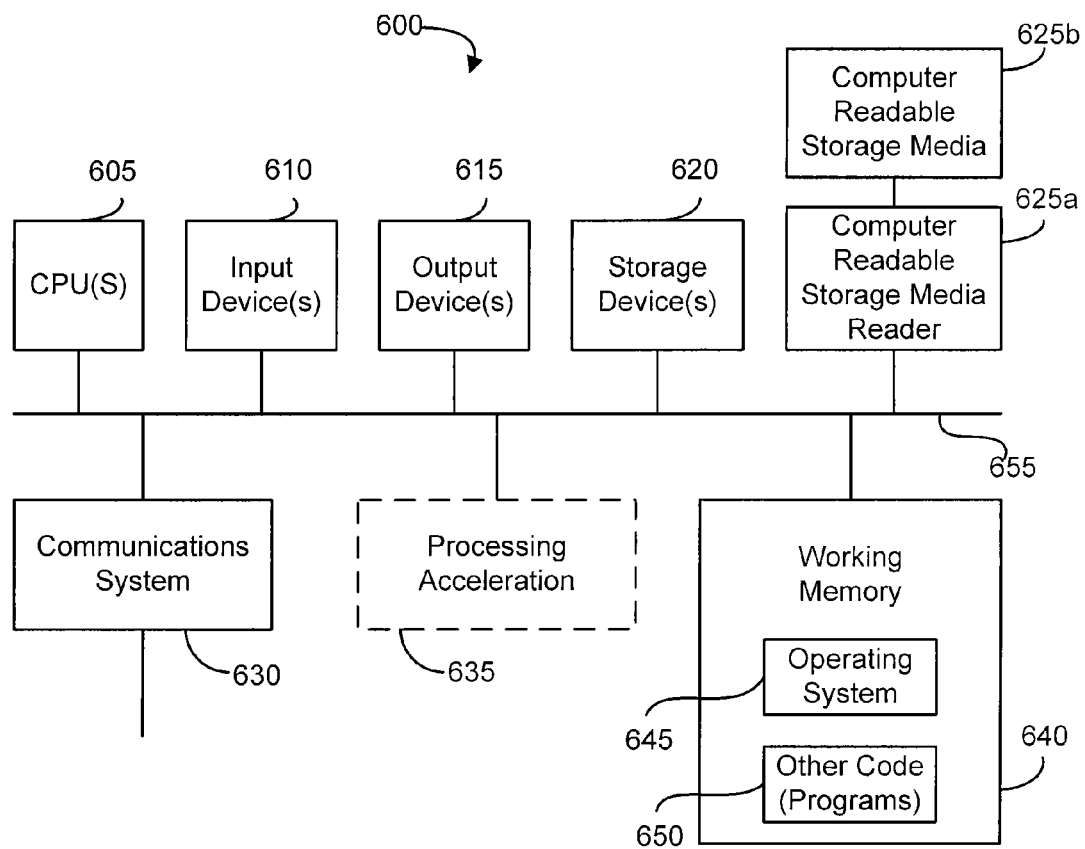
FIG. 6 is a block diagram illustrating an exemplary computer system in which embodiments of the present invention may be implemented.

FIG. 6 illustrates an exemplary computer system 600, in which various embodiments of the present invention may be implemented. The system 600 may be used to implement any of the computer systems described above. The computer system 600 is shown comprising hardware elements that may be electrically coupled via a bus 655. The hardware elements may include one or more central processing units (CPUs) 605, one or more input devices 610 (e.g., a mouse, a keyboard, etc.), and one or more output devices 615 (e.g., a display device, a printer, etc.). The computer system 600 may also include one or more storage device 620. By way of example, storage device(s) 620 may be disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 625*a*, a communications system 630 (e.g., a modem, a network card (wireless or wired), an infra-red communication device, etc.), and working memory 640, which may include RAM and ROM devices as described above. In some embodiments, the computer system 600 may also include a processing acceleration unit 635, which can include a DSP, a special-purpose processor and/or the like.

The computer-readable storage media reader 625a can further be connected to a computer-readable storage medium 625b, together (and, optionally, in combination with storage device(s) 620) comprehensively representing remote, local, fixed, and/or removable storage devices plus storage media for temporarily and/or more permanently containing computer-readable information. The communications system 630 may permit data to be exchanged with the network 620 and/or any other computer described above with respect to the system 600.

The computer system 600 may also comprise software elements, shown as being currently located within a working memory 640, including an operating system 645 and/or other code 650, such as an application program (which may be a client application, web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed. Software of computer system 600 may include code 650 for implementing processes for dynamically providing multimodal and/or multi-device configuration and support.

Figure 7:
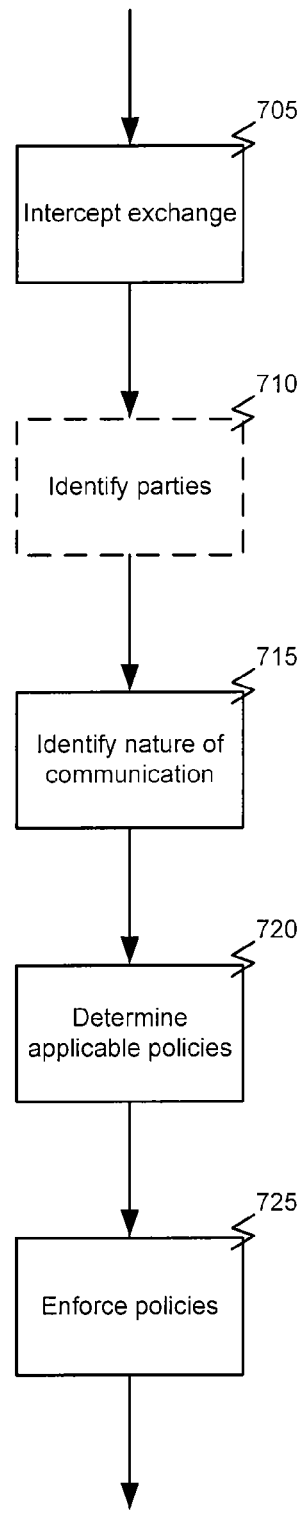
FIG. 7 is a flowchart illustrating a process for providing enhanced features to an Internet streaming system according to one embodiment of the present invention.

FIG. 7 is a flowchart illustrating a process for providing enhanced features to a Internet streaming system according to one embodiment of the present invention. This example illustrates functions that can be performed by a policy enforcer of a custom proxy or any other element discussed above regardless of whether they are implemented in a modified SIP core as discussed above with reference to FIG. 2 or in a custom domain as discussed above with reference to FIG. 3.

In this example, processing begins with intercepting 705 an exchange between one or more parties to a communication. That is, the policy enforcer can intercept a message from one user agent to another. The one or more parties to an exchange can then optionally be identified 710. As noted above, the parties can be identified 710, for example, based on information from the message such as header information, addresses, etc. However, this identification can be considered optional since, in order to listen for and/or intercept messages between the parties, the identities may already be known.

A type of communication represented by the exchange over the Internet streaming system can also be identified 715. The type of communication can comprise, for example, a session initiation message. Alternatively or additionally, the type of communication can comprise a streaming session. In such a case, the streaming session can comprise a multimedia streaming session. In yet another example, the type of communication can comprise a text-based message.

One or more policies applicable to the exchange can be determined 720 and the policies can be enforced 725 to provide the one or more enhanced features. Each of the one or more policies can comprise a logical combination of one or more conditions and one or more actions. The one or more enhanced features can include for example, services for authenticating, authorizing, and/or anonymizing one or more of the parties to the exchange, services for logging information related to the exchange, services for charging one or more parties to the exchange for the exchange, providing Quality of Service (QoS) according to a Service Level Agreement (SLA), and/or any number of other services.

Figure 8:
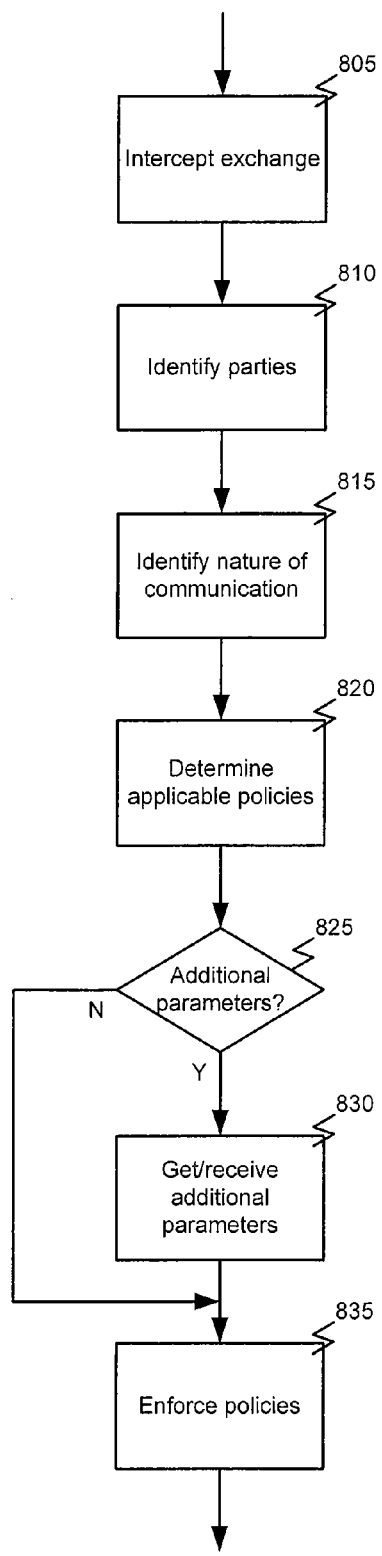
FIG. 8 is a flowchart illustrating a process for providing enhanced features to an Internet streaming system according to an alternative embodiment of the present invention.

FIG. 8 is a flowchart illustrating a process for providing enhanced features to a Internet streaming system according to an alternative embodiment of the present invention. In this example, processing begins with intercepting 805 an exchange between one or more parties to a communication. That is, the policy enforcer can intercept a message from one user agent to another. The one or more parties to an exchange can then be identified 810. As noted above, the parties can be identified 810, for example, based on information from the message such as header information, addresses, etc.

A type of communication represented by the exchange can also be identified 815. The type of communication can comprise, for example, a session initiation message. Alternatively or additionally, the type of communication can comprise a streaming session. In such a case, the streaming session can comprise a multimedia streaming session. In yet another example, the type of communication can comprise a text-based message.

One or more policies applicable to the exchange can be determined 820. Additionally, a determination 825 can be made as to whether additional parameters are required to enforce the policies. In response to determining 825 that additional parameters are required to enforce the policies, the additional parameters can be obtained 830 via an out-of-band channel. Additionally or alternatively, in response to determining additional parameters are required to enforce the policies, the additional parameters can be obtained 830 via information from a header of a packet from the exchange and/or from a payload of a packet from the exchange.

The policies can then be enforced 835 to provide the one or more enhanced features. Each of the one or more policies can comprise a logical combination of one or more conditions and one or more actions. The one or more enhanced features can include for example, services for authenticating, authorizing, and/or anonymizing one or more of the parties to the exchange, services for logging information related to the exchange, services for charging one or more parties to the exchange, and/or any number of other services.

Figure 9:
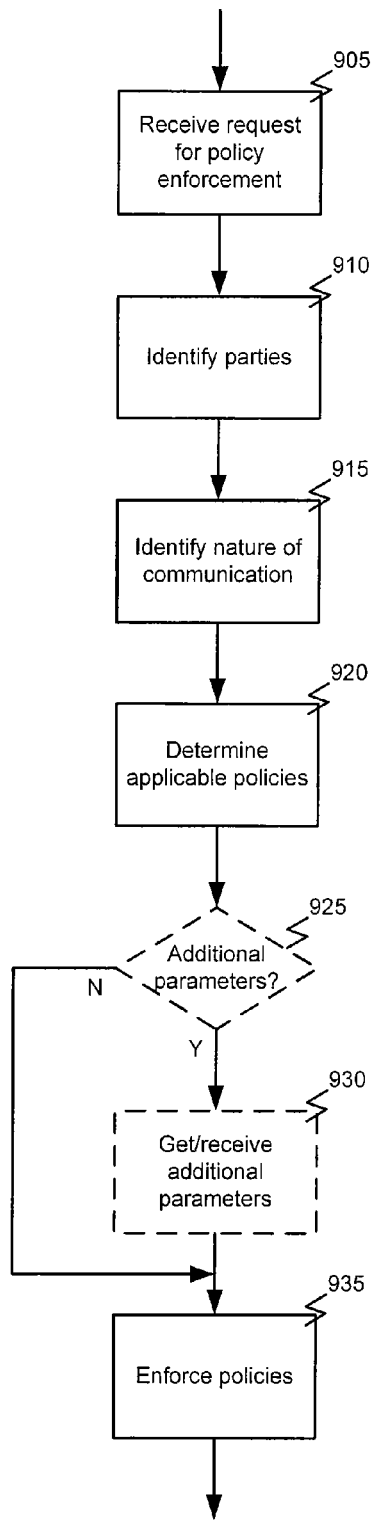
FIG. 9 is a flowchart illustrating a process for providing enhanced features to an Internet streaming system according to yet another embodiment of the present invention.

FIG. 9 is a flowchart illustrating a process for providing enhanced features to a Internet streaming system according to yet another embodiment of the present invention. In this example, processing begins with receiving 905 a request for policy enforcement. That is, in addition to or instead of intercepting communications between user agents, the policy enforcer can be adapted to apply policies in response to a request from one or more user agents or other elements of the system.

One or more parties to the exchange can be identified 910 based on the request. Furthermore, the type of communication represented by the exchange can be identified 915 based on the request. That is, the identity of one or more parties to the communication and/or the type of message or communication can be identified by information in the header, body or other part of the request or in another manner that can be determined from the request. The type of communication can comprise, for example, a session initiation message. Alternatively or additionally, the type of communication can comprise a streaming session. In such a case, the streaming session can comprise a multimedia streaming session. In yet another example, the type of communication can comprise a text-based message. One or more policies applicable to the exchange can be determined 920 based on the request.

One or more policies applicable to the exchange can be determined 920. Additionally, a determination 925 can be made as to whether additional parameters are required to enforce the policies. In response to determining 925 that additional parameters are required to enforce the policies, the additional parameters can be obtained 930 via an out-of-band channel. Additionally or alternatively, in response to determining additional parameters are required to enforce the policies, the additional parameters can be obtained 930 via information from a header of a packet from the exchange and/or from a payload of a packet from the exchange.

The policies can then be enforced 935 to provide the one or more enhanced features. Each of the one or more policies can comprise a logical combination of one or more conditions and one or more actions. The one or more enhanced features can include for example, services for authenticating, authorizing, and/or anonymizing one or more of the parties to the exchange, services for logging information related to the exchange, services for charging one or more parties to the exchange for the exchange, providing Quality of Service (QoS) according to a Service Level Agreement (SLA), and/or any number of other services and/or any number of other services.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing one or more enhanced features to a packet-based streaming communication system, the method comprising:
    identifying a type of communication represented by the exchange over the streaming communication system between parties to the communication, wherein the type of communication comprises one or more of a session control message, a routing message, a call control message, or a media exchange;
    determining one or more policies applicable to the exchange based on the type of communication; and
    enforcing the policies on exchanges between the parties to provide the one or more enhanced features wherein the one or more enhanced features include features for providing security, identity management, and telephone functions to a Voice Over Internet Protocol (VoIP) service, wherein enforcing the policies on exchanges between the parties to provide the one or more enhanced features includes modifying a target address for the exchanges, and wherein enforcing the policies on the exchanges between parties comprises delegating at least one enforcement task to an endpoint of the exchange.

2. The method of claim 1, further comprising identifying one or more parties to an exchange.

3. The method of claim 1, further comprising, prior to identifying the parties to the communication, intercepting the exchange between the parties.

4. The method of claim 3, wherein intercepting the exchange between the parties is performed by a router supporting the communication.

5. The method of claim 3, wherein intercepting the exchange between the parties is performed by a location server supporting the communication.

6. The method of claim 3, wherein intercepting the exchange between the parties is performed between a router and a location server supporting the communication.

7. The method of claim 3, wherein intercepting the exchange between the parties is performed by a sender of the communication.

8. The method of claim 3, wherein intercepting the exchange between the parties is performed by a recipient of the communication.

9. The method of claim 3, wherein intercepting the exchange between the parties is performed by a gateway supporting the communication.

10. The method of claim 3, wherein intercepting the exchange between the parties is performed by a media server supporting the communication.

11. The method of claim 1, wherein determining one or more policies applicable to the exchange is based on the type of communication represented by the exchange.

12. The method of claim 1, wherein determining one or more policies applicable to the exchange is based on an identity of at least one of the parties to the exchange.

13. The method of claim 1, wherein each of the one or more policies comprises a logical combination of one or more conditions and one or more actions.

14. The method of claim 1, wherein the identity management includes services for authenticating one or more of the parties to the exchange.

15. The method of claim 14, wherein the identity management includes services for authorizing one or more of the parties to the exchange to participate in the exchange.

16. The method of claim 15, wherein the identity management includes services for anonymizing one or more of the parties to the exchange.

17. The method of claim 16, wherein the one or more enhanced features further include services for logging information related to the exchange.

18. The method of claim 16, wherein the one or more enhanced features further include services for charging one or more parties to the exchange for the exchange.

19. The method of claim 16, wherein the one or more enhanced features further include services for providing a Quality of Service (QoS) according to a Service Level Agreement (SLA).

20. The method of claim 1, wherein the packet-based streaming communication system comprises a Session Initiation Protocol (SIP) system.

21. The method of claim 20, wherein the type of communication comprises a session initiation message.

22. The method of claim 20, wherein the type of communication comprises a streaming session.

23. The method of claim 22, wherein the streaming session comprises a multimedia streaming session.

24. The method of claim 20, wherein the type of communication comprises a text-based message.

25. The method of claim 1, further comprising, prior to enforcing the policies, determining whether additional parameters are required to enforce the policies.

26. The method of claim 25, further comprising in response to determining additional parameters are required to enforce the policies, obtaining the additional parameters via an out-of-band channel.

27. The method of claim 25, further comprising in response to determining additional parameters are required to enforce the policies, obtaining the additional parameters via information from a header of a packet from the exchange.

28. The method of claim 25, further comprising in response to determining additional parameters are required to enforce the policies, obtaining the additional parameters via information from a payload of a packet from the exchange.

29. The method of claim 1, further comprising, prior to identifying one or more parties to the exchange, receiving a request for policy enforcement.

30. The method of claim 29, wherein identifying one or more parties to the exchange and identifying the type of communication represented by the exchange are based on the request.

31. The method of claim 30, wherein determining one or more policies applicable to the exchange is based on the request.

32. A system comprising:
a communication network;
a first communication node communicatively coupled with the communication network and adapted to send messages via the communications network;
a second communication node communicatively coupled with the communication network and adapted to receive the messages from the first communication node; and
a policy enforcer communicatively coupled with the communication network and adapted to identify a type of communication represented by the messages, determine one or more policies applicable to the communication represented by the messages based on the type of communication, and enforce the policies to provide one or more enhanced features, wherein the type of communication comprises one or more of a session control message, a routing message, a call control message, and a media exchange, wherein the one or more enhanced features include features for providing security, identity management, and telephone functions to a Voice Over Internet Protocol (VoIP) service, wherein enforcing the policies on exchanges between the parties to provide the one or more enhanced features includes modifying a target address for the exchanges, and wherein enforcing the policies delegating at least one enforcement task to the first communication node or the second communication node.

33. The system of claim 32, wherein the policy enforcer is further adapted to intercept the messages from the first communication node to the second communication node.

34. The system of claim 32, wherein the policy enforcer determines one or more policies applicable to the exchange based on an identity associated with at least one of the first communication node and the second communication node.

35. The system of claim 32, wherein the policy enforcer is further adapted to determine whether additional parameters are required to enforce the policies prior to enforcing the policies.

36. The system of claim 35, wherein the policy enforcer is further adapted to obtain the additional parameters via an out-of-band channel in response to determining additional parameters are required to enforce the policies.

37. The system of claim 35, wherein the policy enforcer is further adapted to obtain the additional parameters via information from a header of a packet from the messages from the first communication node in response to determining additional parameters are required to enforce the policies.

38. The system of claim 35, wherein the policy enforcer is further adapted to obtain the additional parameters via information from a payload of a packet from the messages from the first communication node in response to determining additional parameters are required to enforce the policies.

39. The system of claim 32, wherein the policy enforcer is further adapted to receive a request for policy enforcement from the first communication node prior to identifying at least one of the first communication node and the second communication node.

40. The system of claim 32, further comprising:
one or more bindings communicatively coupled with the policy enforcer; and
one or more enablers, each enabler communicatively coupled with at least one binder, wherein the enablers interact with the policy enforcer via the bindings and wherein each enabler is adapted to provide an additional communication function.

41. A system comprising:
a communication network;
a first user agent of a first endpoint device communicatively coupled with the communication network and adapted to send messages via the communications network; and
a second user agent of a second endpoint device communicatively coupled with the communication network and adapted to receive the messages from the first user agent, wherein the second user agent includes a policy enforcer adapted to identify at least one of the first user agent and the second user agent, identify a type of communication represented by the messages, wherein the type of communication comprises one or more of a session control message, a routing message, a call control message, and a media exchange, determine one or more policies applicable to the communication represented by the messages based on the type of communication, and enforce the policies to provide one or more enhanced features wherein the one or more enhanced features include features for providing security, identity management, and telephone functions to a Voice Over Internet Protocol (VoIP) service, wherein enforcing the policies on exchanges between the parties to provide the one or more enhanced features includes modifying a target address for the exchanges, and wherein enforcing the policies on the exchanges between parties comprises delegating at least one enforcement task to the first user agent.

42. The method of claim 1, wherein the type of communication comprises a call control message and wherein the enhanced features comprise third-party call control.

43. The method of claim 42, wherein the one or more enhanced features further comprise one or more of logging information related to the communication, providing Quality of Service (QoS) according to an Service Level Agreement (SLA), and charging for the communication.

44. The method of claim 43, wherein the endpoint of the exchange comprises a media server.

45. The method of claim 44, further comprising delegating at least one enforcement task to a firewall of the packet-based streaming communication system.

* * * * *

UNITED STATES PATENT AND TRADEMARK OFFICE
CERTIFICATE OF CORRECTION

| | | |
|---|---|---|
| PATENT NO. | : 8,542,671 B2 | Page 1 of 1 |
| APPLICATION NO. | : 11/536731 | |
| DATED | : September 24, 2013 | |
| INVENTOR(S) | : Maes | |

It is certified that error appears in the above-identified patent and that said Letters Patent is hereby corrected as shown below:

In the Specification

In column 4, line 38, delete "SEP," and insert -- SIP, --, therefor.

In column 6, line 13, delete "may can be" and insert -- may be --, therefor.

In column 8, line 50, delete "205 ,or" and insert -- 205, or --, therefor.

In column 10, line 44, delete "taregt" and insert -- target --, therefor.

In column 10, line 49, delete "335,then" and insert -- 335, then --, therefor.

In column 11, line 30, delete "taregt" and insert -- target --, therefor.

In column 15, line 41, delete "335,then" and insert -- 335, then --, therefor.

In column 15, line 43, delete "includes" and insert -- include --, therefor.

In column 16, line 34, delete "SIP ULRI" and insert -- SIP URI --, therefor.

In column 16, line 42, delete "SIP UlRIs" and insert -- SIP URIs --, therefor.

In column 17, line 58, delete "2prior" and insert -- prior --, therefor.

Signed and Sealed this
Twenty-fifth Day of February, 2014

Michelle K. Lee
*Deputy Director of the United States Patent and Trademark Office*